United States Patent
Fortin et al.

(10) Patent No.: US 7,283,475 B2
(45) Date of Patent: Oct. 16, 2007

(54) FRACTAL DIMENSION ANALYSIS FOR DATA STREAM ISOLATION

(75) Inventors: Christopher S. Fortin, No. Kingston, RI (US); David B. Cousins, Barrington, RI (US)

(73) Assignee: BBN Technologies Corp., Cambridge, MA (US)

( * ) Notice: Subject to any disclaimer, the term of this patent is extended or adjusted under 35 U.S.C. 154(b) by 1074 days.

(21) Appl. No.: 10/264,777

(22) Filed: Oct. 4, 2002

(65) Prior Publication Data

US 2003/0076782 A1    Apr. 24, 2003

Related U.S. Application Data

(63) Continuation-in-part of application No. 10/167,620, filed on Oct. 19, 2001, now Pat. No. 7,170,860.

(60) Provisional application No. 60/339,497, filed on Oct. 26, 2001, provisional application No. 60/340,779, filed on Oct. 30, 2001, provisional application No. 60/355,573, filed on Feb. 5, 2002.

(51) Int. Cl.
*H04L 12/26* (2006.01)
(52) U.S. Cl. .................... 370/235; 370/252
(58) Field of Classification Search .............. None
See application file for complete search history.

(56) References Cited

U.S. PATENT DOCUMENTS

| | | | |
|---|---|---|---|
| 5,793,762 A | 8/1998 | Penners et al. | |
| 5,838,919 A | 11/1998 | Schwaller et al. | |
| 5,859,979 A | 1/1999 | Tung et al. | |
| 5,881,237 A | 3/1999 | Schwaller et al. | |
| 5,999,563 A | 12/1999 | Polley et al. | |
| 6,021,158 A | 2/2000 | Schurr et al. | |
| 6,484,203 B1 | 11/2002 | Porras et al. | |
| 6,519,703 B1 | 2/2003 | Joyce | |
| 6,546,017 B1 | 4/2003 | Khaunte | |
| 6,546,834 B1* | 4/2003 | Benuzzi | 83/36 |
| 6,597,661 B1 | 7/2003 | Bonn | |
| 6,601,208 B2* | 7/2003 | Wu | 714/752 |
| 6,662,223 B1* | 12/2003 | Zhang et al. | 709/224 |
| 6,700,895 B1 | 3/2004 | Kroll | |
| 6,718,395 B1 | 4/2004 | Ziegler | |
| 6,950,404 B2* | 9/2005 | Pearl | 370/252 |
| 6,958,977 B1 | 10/2005 | Mitrani et al. | |
| 6,977,942 B2* | 12/2005 | Raisanen | 370/429 |
| 6,981,158 B1 | 12/2005 | Sanchez | |

(Continued)

OTHER PUBLICATIONS

James Gordon, Parto Process as a model of self-similar packet traffic, May 1995 IEEE, pp. 2232-2236.*

(Continued)

*Primary Examiner*—Andrew C. Lee
(74) *Attorney, Agent, or Firm*—Ropes & Gray LLP

(57) ABSTRACT

A network tap [120/220] monitors traffic transmissions in a network [100/200]. The tap records transmission time information [501] between data transmitted in the network. From the transmission time information, the tap calculates differences in transmission times [500], and assumes the differences in transmission times are distributed as fractional gaussian noise. Housdorff dimensions are calculated for the fractional gaussian noise distributions. The Housdorff dimensions are used to generate traffic analysis information for the network, even when the data transmitted on the network is encrypted.

31 Claims, 5 Drawing Sheets

U.S. PATENT DOCUMENTS

| | | | |
|---|---|---|---|
| 7,012,893 B2* | 3/2006 | Bahadiroglu | 370/231 |
| 2002/0032871 A1 | 3/2002 | Malan et al. | |
| 2002/0039371 A1* | 4/2002 | Hedayat et al. | 370/516 |
| 2002/0112060 A1 | 8/2002 | Kato | |
| 2002/0150102 A1 | 10/2002 | Janko et al. | |
| 2003/0023918 A1* | 1/2003 | Wu | 714/751 |
| 2004/0057376 A1* | 3/2004 | Sasvari et al. | 370/230 |
| 2006/0067245 A1* | 3/2006 | Pearl | 370/252 |

OTHER PUBLICATIONS

Abry et al., "Multiscale Nature of Network Traffic," IEEE Signal Processing Magazine, pp. 28-46, (2002).

Boufaden et al., "Topic Segmentation: A First Stage to Dialog-Based Information Extraction," Department of Computer Science and Operations Research, University of Montreal, Quebec, Canada, 7 pages.

Cappe et al., "Long-Range Dependence and Heavy-Tail Modeling for Teletraffic Data," IEEE Signal Processing Magazine, pp. 14-27, (2002).

Guerin et al., "A Unified Approach to Bandwidth Allocation and Access Control in Fast Packet-Switched Networks," IEEE INFOCOM, pp. 1-12, (1992).

Hazen et al., "Recent Improvements in an Approach to Segment-Based Automatic Language identification," Spoken Language Systems Group, Laboratory for Computer Science, Massachusetts Institute of Technology, Cambridge, MA, 4 pages.

Kay, S.M. "Modern Spectral Estimation: Theory & Application," Prentice Hall, (1988).

Oppenheim et al., "Discrete-Time Signal Processing," Prentice Hall, (1989).

Parekh, A.K., "A Generalized Processor Sharing Approach to Flow Control in Integrated Services Networks," MIT Ph.D. Thesis, (Feb. 1992).

Partridge, C., "Gigabit Networking," Addison-Wesley, (1994).

Ramus et al., "Language Identification with Suprasegmental Cues: A Study based on Speech Resynthesis," Journal of the Acoustical Society of America, 105(1):512-521, (1999).

Savage et al., "Practical Network Support for IP Traceback," Department of Computer Science and Engineering, University of Washington, Seattle, WA, 12 pages.

Schwartz et al., "Smart Packets: Applying Active Networks to Network Management," ACM Transaction on Computer Systems, 18(1):67-88, (2000).

Tagliaferri et al., "Hybrid Neural networks for Frequency Estimation of Unevenly Sampled Data," IEEE, pp. 975-979, (1999).

Turner, Jonathan, "New Directions in Communications (or Which Way to the Information Age!)," IEEE Communications Magazine, 24(10):8-15, (Oct. 1986).

Co-pending U.S. Appl. No. 09/881,145, filed Jun. 14, 2001.

Co-pending U.S. Appl. No. 10/044,073, filed Jan. 11, 2002.

\* cited by examiner

FRACTAL DIMENSION ANALYSIS FOR DATA STREAM ISOLATION

RELATED APPLICATION

This application claims the benefit of priority under 35 U.S.C. § 119(e) of three provisional applications, Ser. Nos. 60/339,497, 60/340,779, and 60/355,573, filed Oct. 26, 2001, Oct. 30, 2001, and Feb. 5, 2002, respectively, the entire contents of which are incorporated herein by reference.

This application is also a continuation-in-part (CIP) under 37 C.F.R. § 1.53(b) of application Ser. No. 10/167,620, filed Oct. 19, 2001, now U.S. Pat. No. 7,170,860 the entire contents of which are incorporated herein by reference.

GOVERNMENT INTEREST

The invention described herein was made with government support. The U.S. Government may have certain rights in the invention, as provided by the terms of contract No. MDA972-01-C-0080 awarded by the Defense Advanced Research Projects Agency (DARPA).

BACKGROUND OF THE INVENTION

A. Field of the Invention

The present invention relates generally to network traffic analysis, and more specifically, to the monitoring of data transmitted over a wireless or wired network.

B. Description of Related Art

Communication networks typically include a number of interconnected communication devices. Connections among the devices in some communication networks are accomplished through physical wires or optical links. Such networks may be referred to as "wired" networks. Connections among the devices in other communication networks are accomplished through radio, infrared, or other wireless links. Such networks may be referred to as "wireless" networks.

In certain situations, operators of networks may desire to encrypt data packets transmitted on the network. Conventionally, a packet is a data unit that includes a header portion and a payload portion. The header portion includes control information used to route the packet in the network and the payload portion contains the content data the packet is delivering. Military applications are one example in which data packets are encrypted before being transmitted. This may include encrypting the payload portion of each packet so that the content of the communication cannot be understood by eavesdroppers.

Simply encrypting the payload portion of a packet still allows eavesdroppers to examine the packet header information, through which the eavesdropper may extract valuable information. For example, monitoring the flow of traffic patterns to and from network end-nodes (i.e., sources and destinations) along with the quantity of information transmitted between the end-nodes may allow an eavesdropper to gain valuable intelligence information from the wireless network. For example, a sudden burst of wireless network traffic between multiple known enemy tank groups may indicate that the tank groups are about to perform some type of coordinated action.

In order to restrict the ability of an eavesdropper to monitor traffic flow, routers in a network may encrypt the packet header information before transmitting the packet. Intercepted packets would, thus, have both their payload and header information encrypted, making it difficult for the eavesdropper to monitor traffic flow. Alternatively, the wireless network may be configured to support virtual private network (VPN) connections in which the originating and receiving network addresses are encrypted. This type of VPN also makes it difficult for an eavesdropper to monitor traffic flow.

In situations such as military encounters and in law enforcement, it can be desirable to monitor traffic flow over networks. Accordingly, there is a need in the art to be able to monitor traffic flow even when the address information of transmitted packets is encrypted.

SUMMARY OF THE INVENTION

Systems and methods consistent with the present invention provide for traffic analysis of network transmissions even when the network transmissions are encrypted.

One aspect of the invention is directed to a method of analyzing communications in a network. The method includes obtaining time of transmission information for chunks of data in the network and calculating differences in times of transmission between successive chunks. Further, the method includes analyzing traffic flow in the network based on the calculated differences in times of transmission.

A second aspect of the invention is directed to a system for analyzing traffic flow in a network. The system comprises at least one network tap configured to passively observe traffic transmission times in the network. At least one processor is configured to calculate differences in times of transmission based on the traffic transmission times observed over a predetermined period. The system analyzes traffic flow in the network based on the calculated differences in times of transmission.

Another method consistent with the present invention comprises a number of acts. In particular, the method comprises receiving chunks of data from a network and generating transmission time differences between the received chunks. Further, based on the generated transmission time differences, the method estimates a Housdorff dimension and analyzes traffic flow in the network based on the estimated Housdorff dimensions.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

As is generally described herein, a system monitors traffic flow in a network. The system identifies traffic flow by calculating time intervals between successive transmissions in the flow and then characterizes the time differences as a random variable distributed as Fractional Gaussian Noise.

Exemplary Wired Network

Figure 1:
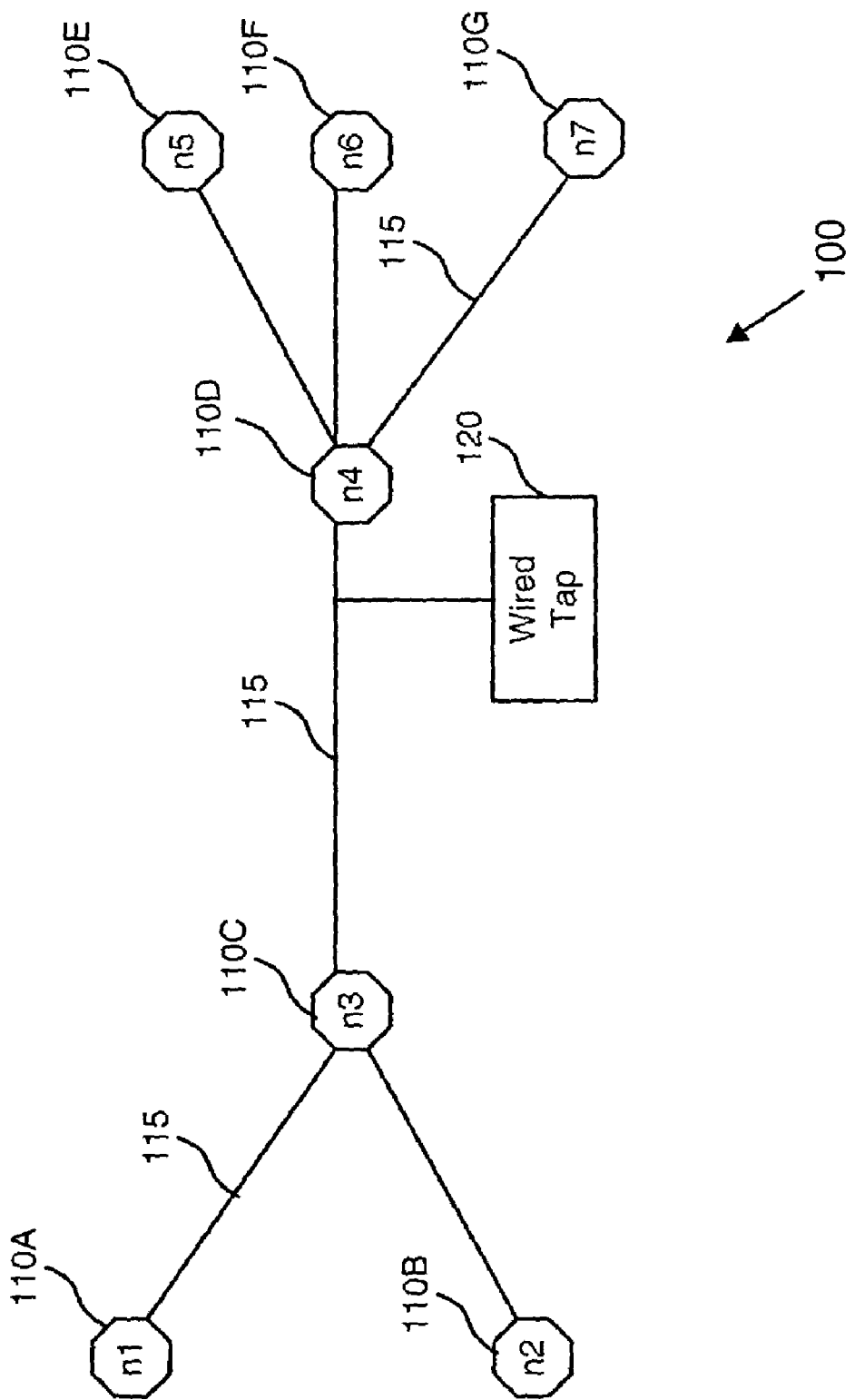
FIG. 1 is a block diagram generally illustrating a wired network.

FIG. 1 is a diagram illustrating an exemplary wired network 100 according to an implementation consistent with the present invention. The wired network 100 may include a number of network nodes 110A . . . 110G (collectively referred to as nodes 110) connected by a number of network links 115. The wired network 100 may also include one or more network wired taps 120. Although seven nodes 110 and one wired tap 120 are shown connected in a particular configuration, this is purely exemplary. Wired network 100 may include any number and configuration of nodes 110, links 115, and taps 120.

Network nodes 110 may be configured to send and receive information according to a communication protocol, such as TCP/IP. Although not specifically shown, some nodes 110 may be configured to provide a route for information to a specified destination. Other nodes 110 may be configured to send the information according to a previously determined route. The network nodes 110 may communicate via discrete "chunks" of data that are transmitted by "senders" 110.

A chunk may be individually detectable or distinguishable (i.e., a listening device, such as tap 120, may determine when a chunk starts and ends). A chunk of data may correspond to a data packet, although a chunk does not necessarily have to exactly correspond to a packet of data. For example, a chunk may represent part of a packet (e.g., a fragment or an ATM cell of an AAL5 PDU), or multiple packets (e.g., two packets concatenated).

Chunks of data may be transmitted by one of sending nodes 110, for example, by sending node 110C (a "sender"). A wired sender 110C may be the most recent node 110 to transmit a particular chunk (e.g., node n3 in FIG. 1, if the tap 120 intercepts a chunk transmitted to node n4). The sender 110C is not necessarily the node 110 that originated the chunk.

Network links 115 may include electronic links (e.g., wires or coaxial cables) and optical links (e.g., fiber optic cables). These links 115 may provide a connection between two nodes 110 (e.g., nodes n1 and n3). It may be possible to physically tap into these links 115 to observe the information carried on them.

Wired tap 120 is a device that may intercept chunk transmissions on the network 100. Wired tap 120 may include a physical connection to a corresponding link 115 and circuitry to detect chunks of data on the link 115. Wired tap 120 may intercept chunks at a physical layer, a link layer, a network layer, or at higher layers of the network 100 being monitored. The layer at which interceptions occur is within the abilities of those skilled in the art, and may be chosen based on knowledge of, and access to, the network links 115. The tap 120 may include, for example, a transceiver for sensing the chunks of data and may also include other circuitry (e.g., clock circuitry) for determining times of arrival and duration of the chunks. The wired tap 120 may include a processor for computing any other information associated with the chunks, such as information (e.g., sending node and/or receiving node) contained within a header of the chunk of data.

Wired tap 120 may observe traffic on the 115 between nodes n3 and n4. Wired tap 120 may record information about all the chunks that it observes in a "tracefile." A tracefile, as used herein, broadly refers to any file, record, or data structure that stores information about the chunks. The tracefile may contain a minimum amount of information for each observed chunk. For example, the information may include the time the chunk was seen and the identity of the sender 110 of the chunk. The identity of the sender 110 may include, for example, the IP address of an IPsec gateway, the upstream or downstream transmitter on the point-to-point link 115, or "the same sender 110 as the one that also sent these other chunks." If available, the tracefile may also include additional information about the length or duration of the chunk, a destination node 110, or any insight into the contents of the chunk. Other information that may be available is the location of wired tap 120 along the link 115 relative to the nodes 110 at either end of the link 115.

Wired tap 120 may not capture all traffic on the link 115. For example, wired tap 120 may occasionally make an error and mistakenly believe it has seen a chunk when no chunk was sent (e.g., due to bit errors on wired network 100). If transmissions are missed, false transmissions are detected, or if a sender 110 is misclassified, these events may be viewed as adding noise to the signals generated by the tap 120. Other sources of noise in the signal generated by the tap 120 may include interference from other signals (e.g., packets belonging to another flow, or jitter in timing due to sharing of a bottleneck among multiple flows).

Wired tap 120 may listen passively and may not participate in the monitored network 100 at the MAC (or higher) layers. In some cases, for example with 802.3 LANs, it is possible for the tap 120 to snoop at the MAC layer and extract some information about higher layer protocols. In the case of SONET networks, however, little or no information may be available about the MAC or higher layer protocols.

Although a single wired tap 120 is shown in FIG. 1, wired network 100 may contain many wired taps 120, which may be interconnected. Wired taps 120 may work independently using purely local information. Distributed algorithms may allow sharing of information among wired taps 120. In such a case, wired taps 120 may have a globally synchronized clock that allows information from multiple taps 120 to be combined. A clock resolution of the taps 120 may be finer than the data sampling resolution of the taps 120, so that information about transmissions (e.g., the start time, duration, inter-transmission gap, and even the presence of short transmissions) is not missed.

A tap 120 (or a network of taps 120) may store the transmissions that it detects for a sufficient amount of time. For example, the roundtrip time of a transport layer flow cannot be determined if the history that may be stored at tap 120 is less than one roundtrip time. The total volume of data that must be stored depends on the capacity of the link 115 and the maximum roundtrip time of flows seen on the link 115. Taps 120 may assign a unique identifier to each sender 110, for example, the address of the IPsec gateway. Taps 120 in the network 100 may assign the same unique identifier to any given sender 110.

Exemplary Wireless Network

Figure 2:
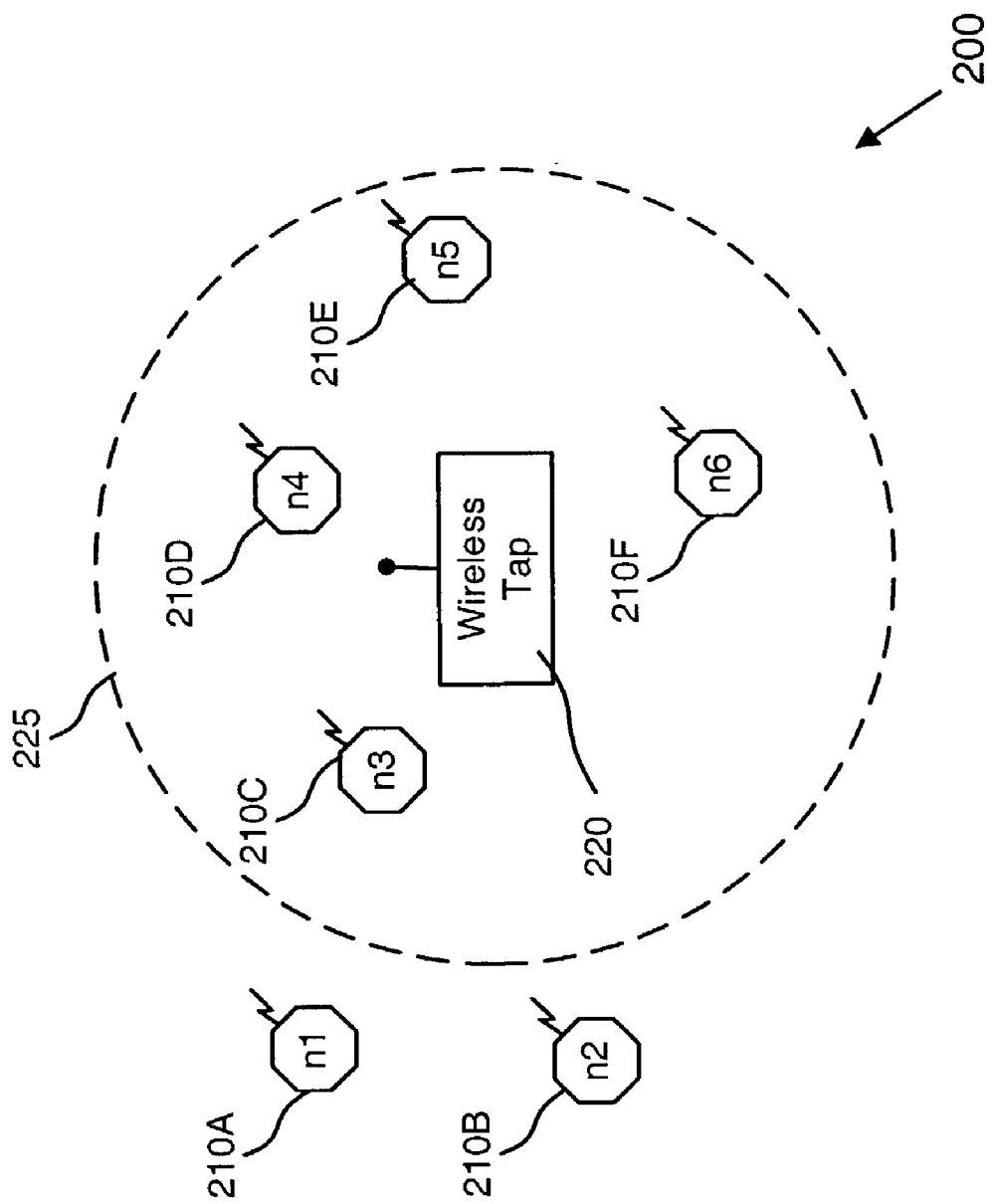
FIG. 2 is a block diagram generally illustrating a wireless network.

FIG. 2 is a diagram illustrating an exemplary wireless network 200 according to an implementation consistent with the present invention. The wireless network 200 may include a number of wireless nodes 210A . . . 210F (collectively referred to as wireless nodes 210) and one or more wireless taps 220. The wireless, or mobile, nodes 210 may communicate via wireless transmission, either point-to-point or, more typically, broadcast transmission. The wireless tap 220 may have an associated area 225 in which it may be able to intercept wireless transmissions.

Although six nodes 210 and one tap 220 are shown in FIG. 2, this is purely exemplary. Wireless network 200 may include any number and configuration of nodes 210 and taps 220. The behavior and operation of the wireless nodes 210 and the wireless tap 220, when similar to the network nodes 110 and tap 120 described above, will not be repeated.

Wireless nodes 210 may communicate via chunks of data that are transmitted by a sender node 210, for example, node 210C. Sender node 210C may transmit using various types of wireless physical layers, such as terrestrial RF, satellite bands, and free space optical. Nodes n1-n6 may include, for example, radio routers or client radios in the wireless network 200.

Wireless tap 220 is a device that may intercept wireless transmissions on wireless network 200. The wireless tap 220 may include, for example, a transceiver for sensing the chunks of data and may also include other circuitry (e.g., clock circuitry) for determining times of arrival and duration of the chunks. The wireless tap 220 may include a processor for computing any other information (e.g., the sending or receiving node) associated with the chunks, such as information contained within a header of the chunk of data. Unlike wired tap 120, which may detect chunks of data only on a certain link 115, wireless tap 220 may observe some (potentially very large) fraction of the wireless spectrum and, thus, may see transmissions from a wide range of senders 210. As shown in FIG. 2, wireless tap 220 may have a limited effective reception range. Dashed line 225 indicates an effective reception area through which tap 220 may receive communications from the nodes. As shown, nodes n1 and n2 are out of the effective reception area and will not be monitored by wireless tap 220. Nodes n3-n6, which are within the range 225, may be monitored by wireless tap 220.

Wireless tap 220 may record information about all the chunks that it observes in a tracefile. The tracefile may contain a minimum amount of information for each observed chunk. For example, the information may include the time the chunk was seen and the identity of the sender 210 of the chunk. The identity of the sender 210 may include, for example, the IP address of an IPsec gateway, the location of a radio transmitter 210, or "the same sender 210 as the one that also sent these other chunks." If available, the tracefile may also include additional information about the length or duration of the chunk, the destination node 210, or any insight into the contents of the chunk. Other information that may be available is the geographic location of the tap 220, as determined by, for example, a global positioning system (GPS) receiver.

Wireless tap 220 may not capture all traffic within its range 225. For example, reception on the wireless network 200 may be variable due to environment, noise, transmission power, or jamming such that wireless tap 220 may be unable to observe some transmissions. Furthermore, wireless tap 220 may occasionally make an error and mistakenly believe it has seen a chunk when no chunk was sent (again due to noise on a wireless network). If transmissions are missed, false transmissions are detected, or if a sender 210 is misclassified, these events may be viewed as adding noise to the signals generated by the wireless tap 220. Other sources of noise in the signal generated by the wireless tap 220 may include interference from other signals (e.g., packets belonging to another flow, or jitter in timing due to sharing of a bottleneck among multiple flows).

Wireless tap 220 may listen passively and may not participate in the monitored network 200 at the MAC (or higher) layers. In some cases, for example with 802.11b LANs, it is possible for the wireless tap 220 to snoop at the MAC layer and extract some information about higher layer protocols. In the case of tactical ad hoc networks, however, little or no information may be available about the MAC or higher layer protocols.

Although a single wireless tap 220 is shown in FIG. 2, wireless network 200 may contain many wireless taps 220, which may be interconnected. In general, the number of wireless taps 220 placed in network 200 is determined by the desired coverage level of network 200. Wireless taps 220 may work independently using purely local information. Distributed algorithms may allow sharing of information among wireless taps 220. In such a case, wireless taps 220 may have a globally synchronized clock that allows information from multiple wireless taps 220 to be combined. A clock resolution of the wireless taps 220 may be finer than the data sampling resolution of the wireless taps 220, so that information about transmissions (e.g., the start time, duration, inter-transmission gap, and even the presence of short transmissions) is not missed.

In the presence of nodes 210 that are mobile (for example, in ad hoc wireless networks or Mobile IP), wireless taps 220 may, but need not, be mobile. Wireless taps 220 may be placed randomly over a specified geographic area, or in a pattern. Senders 210 can move into or out of range of one or more wireless taps 220. Senders 210 typically may dwell in the range of one or more wireless taps 220 long enough for transmissions to be observed, and the sources identified and recorded. Wireless taps 220 may assign a unique identifier to each sender 210, for example, based on their RF signature, or the address of the IPsec gateway. Wireless taps 220 in the network 200 may assign the same unique identifier to any given sender 210.

Exemplary System-Level Processing

Figure 3:
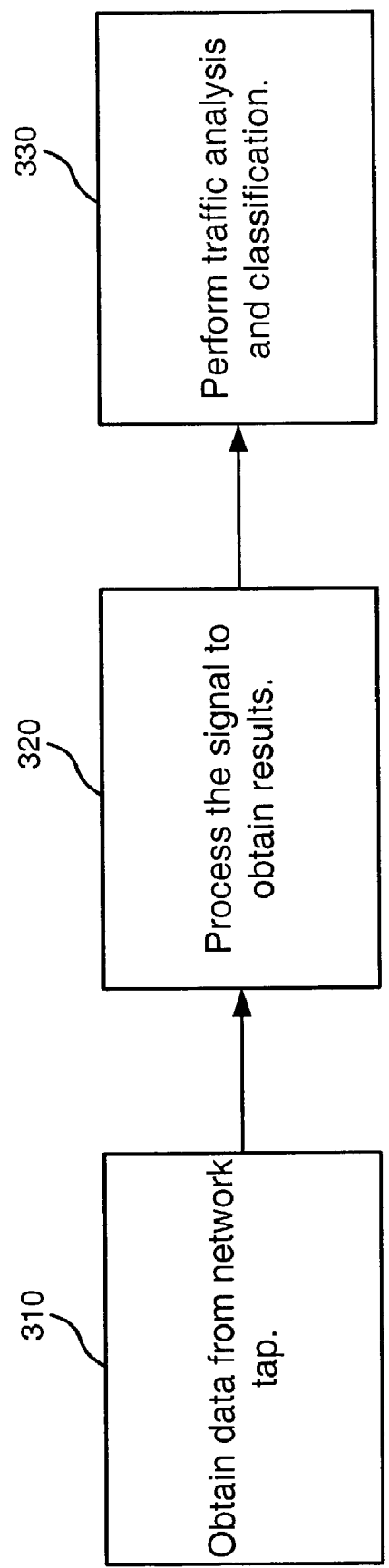
FIG. 3 is an exemplary diagram of traffic flow analysis in the networks of FIGS. 1 and 2.

FIG. 3 is an exemplary diagram of traffic flow analysis and classification processing in networks 100 and 200. Processing may begin with a tap 120/220 obtaining data from its respective network 100/200 (act 310).

Either the tap 120/220 or an associated (possibly central) processor (not shown) may perform processing on the data obtained by the tap 120/220 to produce results (act 320). Such signal processing may produce identifiable signal traffic features, and may be computationally intensive. Those skilled in the art will appreciate, based on processing and networking requirements, whether to perform the signal processing at each tap 120/220 or other location(s).

The signal processing results may be further processed to analyze and classify the traffic on the network 100/200 (act 330). Again, such traffic analysis processing may be performed by the tap 120/220 or another processor. Acts 310-330 may be broadly characterized as "signal generation," "signal processing," and "traffic analysis," respectively. These acts will be described in greater detail for certain implementations below.

Exemplary Signal Processing Using Fractal Dimension Analysis

Once a tap 120/220 has generated a tracefile of tapped data, the tap may process the data into a form amenable to traffic analysis or traffic classification.

Figure 4:
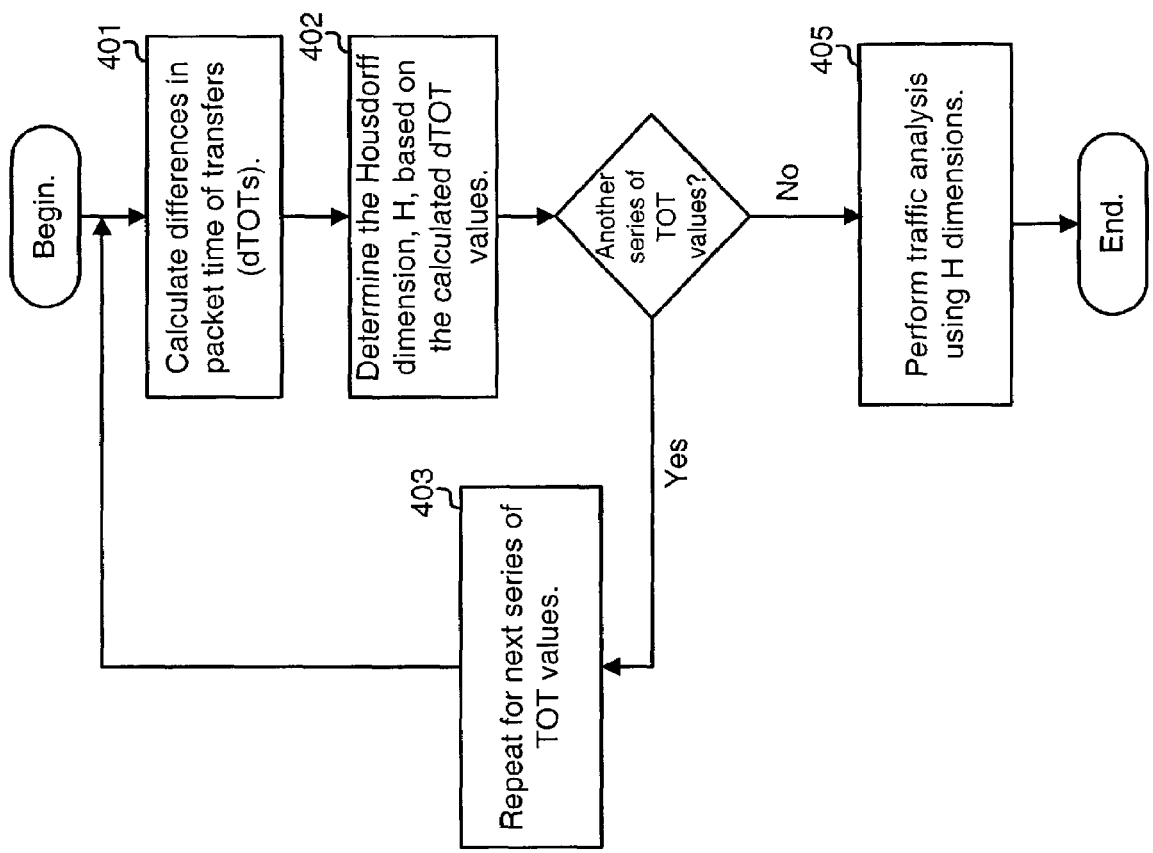
FIG. 4 is a flow chart illustrating operations consistent with the present invention for performing network traffic analysis.

FIG. 4 is a flowchart illustrating operations consistent with the present invention for processing a signal into a form amenable to traffic analysis, as performed in signal processing act 320 (FIG. 3).

As previously mentioned, a tracefile may represent discrete events, namely a sequence of events associated with different times, such as the time of transmission (TOT) for each received chunk. The tracefile may include other information (e.g., sender or recipient information) associated with the events.

Figure 5:
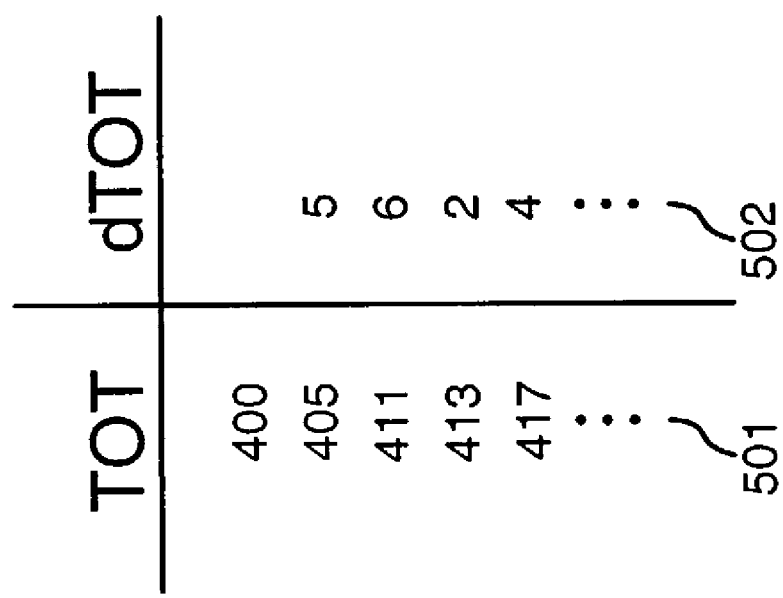
FIG. 5 is a diagram illustrating an exemplary series of values corresponding to a node in a network observed over a predefined time interval.

Tap 120/220 may begin by calculating differences in successive chunk time of transfers (dTOTs) (act 401). The TOT values may be stored in the tap's trace file. FIG. 5 illustrates a series of chunk TOTs (column 501) and a corresponding series of calculated dTOTs (column 502). In one implementation, the series of values in column 501 is repeatedly measured over a relatively short time interval, such as a time interval on the order of milliseconds. After each time interval, a new TOT series is measured and a corresponding new dTOT series is calculated. FIG. 5 illustrates a portion of a TOT series measured over a single time interval.

Consistent with an aspect of the present invention, the series of dTOT values 502 are assumed to have a random distribution that is distributed as Fractional Gaussian Noise (FGN). An FGN distribution is parameterized by the Housdorff dimension, H. Given a series of values, such as dTOT values 502, the Housdorff dimension may be calculated using, for example, maximum likelihood estimation techniques. In general, FGN distributions and the calculation of the Housdorff dimension using maximum likelihood estimators are well known in the art and will not be described further herein.

Tap 120/220 determines the Housdorff dimension for the calculated series of dTOT values 502 (act 402). A tap 120/220 may estimate the Housdorff dimension of the dTOT values using a maximum likelihood estimator. The dTOT values for a time interval and the Housdorff dimension calculated for these values may correspond to chunks from more than one data stream. For example, multiple data streams entering a router may be intermingled in some manner when transmitted as the output data stream. Accordingly, the Housdorff dimension calculated over a particular time interval may represent a composite Housdorff dimension corresponding to a number of component Housdorff dimension values that each represent individual data streams.

Acts 401 and 402 may be repeated for each successive series of received TOT values (acts 403 and 404). In one implementation, each series of TOT values may be measured over a relatively short predetermined time interval (e.g., 10 milliseconds). Accordingly, after each time interval, tap 120/220 measures the TOT values of the next series of received packets and recalculates the dTOT values.

Each Housdorff dimension calculated in acts 401 and 402 represents a short time portion of an individual data stream or of a composite data stream. The tracefile, which associates senders 110/210 with the measured TOT values, may thus be used to associate the Housdorff dimensions with the senders 110/210. Additionally, changes in the calculated Housdorff dimension for a composite data stream measured at different taps 120/220, may be used to indicate that a component data stream has stopped or started between the taps 120/2220. Consistent with aspects of the present invention, the Housdorff dimensions and their associated senders 110/210 may be used by tap 120/220, or other processors, in performing traffic analysis of the data streams in network 100/200 (act 405). This aspect of the present invention is described below.

Traffic Analysis Based on Calculated Housdorff Dimensions

As discussed above, the calculated Housdorff dimensions are used as representations of data streams. Accordingly, by correlating a series of Housdorff dimensions calculated for a number of nodes, the Housdorff dimensions can be used to follow the flow of data in a network. For example, if a first calculated series of Housdorff dimensions is observed at a first node, and the same series of Housdorff dimensions is later observed for a second node, system 100/200 may assume that the traffic corresponding to the calculated Housdorff dimensions traveled from the first node to the second node. Further, if the series of Housdorff dimensions observed at the second node later changes so that it does not match the Housdorff dimensions at the first node, system 100/200 may assume that a component data stream has started or stopped transmission at a point between the first and second nodes.

Additionally, certain sources, or certain types of communications, may have characteristic Housdorff dimensions that define a "signature" for that source or that type of communication. Tap 120/220 may, thus, analyze its calculated values and classify them as belonging to certain signatures. Classification of signatures is generally understood by those skilled in the signal processing arts. Various techniques are known to classify a certain signature into one or more different classes. Generally, these techniques involve training or otherwise developing a number of known signatures, against which a candidate signature may be compared.

CONCLUSION

Probabilistic traffic analysis is performed by assuming that the differences between successive transfers on a network are distributed as Fractional Gaussian Noise. An FGN is characterized by the Housdorff dimension. Housdorff dimensions are calculated over short time periods for a network node based on the series of differences between successive transfer times for that time period. Each calculated Housdorff dimension is used as a representation of the network traffic for the associated measured time period.

The foregoing description of preferred embodiments of the invention provides illustration and description, but is not intended to be exhaustive or to limit the invention to the precise form disclosed. Modifications and variations will be apparent to those skilled in the art in light of the above teachings or may be acquired from practice of the invention.

For example, although the exemplary processing was primarily described in the context of a single tap 120/220, multiple taps may function in conjunction with one another. In this implementation, the multiple taps may transmit their observed information to a central processing node, which may then perform traffic analysis based on the observed information from the taps.

Further, the processing shown in FIG. 4 may be performed by a computer program or software instructions executed on a general-purpose processor (not shown). Where expeditious, some instructions may be performed in parallel on multiple processors. The computer program or software instructions may be embodied on a computer-readable medium (e.g., magnetic, optical, semiconductor, etc.) that is readable by the general-purpose processor.

Moreover, the acts in FIG. 4 need not be implemented in the order shown; nor do all of the acts need to be performed. Also, those acts which are not dependent on other acts may be performed in parallel with the other acts.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method of analyzing communications in a network, comprising:
   obtaining time of transmission information for chunks of data in the network;
   determining differences in times of transmission between successive chunks of data based on the time of transmission information;
   analyzing traffic flow in the network based on the determined differences in the times of transmission; and
   generating a Housdorff dimension from the differences in times of transmission, the Housdorff dimension characterizing traffic flow corresponding to the chunks of data.

2. The method of claim 1, wherein the time of transmission information is obtained over a predetermined time interval.

3. The method of claim 1, wherein generating the Housdorff dimension includes:
   estimating the Housdorff dimension using a maximum likelihood estimator.

4. The method of claim 1, wherein the analyzing traffic flow further comprises: comparing Housdorff dimensions calculated for multiple nodes in the network; and determining traffic flow start/stop between the multiple nodes based on the comparison.

5. The method of claim 1, wherein the time of transmission information includes an identification of a node on the network that transmitted the chunk of data.

6. The method of claim 1, wherein the network is a wireless network.

7. The method of claim 1, wherein the network is a wired network.

8. The method of claim 1, further comprising: classifying a communication associated with the chunks of data based on the Housdorff dimension.

9. A system for analyzing traffic flow in a network, the system comprising:
   at least one network tap for passively observing traffic transmission times in the network;
   at least one processor for calculating differences in times of transmission based on the traffic transmission times observed over a predetermined period; and
   means for analyzing traffic flow in the network based on the calculated differences in times of transmission;
   wherein the analyzing means analyzes the traffic flow in the network by assuming that the differences in times of transmission have a random distribution that is distributed as fractional gaussian noise.

10. The system of claim 9, wherein the network tap generates a Housdorff dimension from the differences in times of transmission, the Housdorff dimension for characterizing traffic flow corresponding to the traffic in the network.

11. The system of claim 10, wherein the Housdorff dimension is estimated using a maximum likelihood estimator.

12. The system of claim 10, wherein the Housdorff dimension corresponds to the traffic in the network, wherein the traffic is obtained from a plurality of individual traffic streams.

13. The system of claim 9, wherein the network is a wireless network.

14. The system of claim 9, wherein the network is a wired network.

15. A system for analyzing traffic flow in a network, the system comprising:
   at least one network tap for passively observing traffic transmission times in the network;
   at least one processor for calculating differences in times of transmission based on the traffic transmission times observed over a predetermined period; and
   means for analyzing traffic flow in the network based on the calculated differences in times of transmission;
   wherein the observed traffic transmission times include an identification of the network that transmitted the traffic.

16. The system of claim 15, wherein the analyzing means analyzes the traffic flow in the network by assuming that the differences in times of transmission have a random distribution that is distributed as fractional gaussian noise.

17. The system of claim 15, wherein the network tap generates a Housdorff dimension from the differences in times of transmission, the Housdorff dimension for characterizing traffic flow corresponding to the traffic in the network.

18. The system of claim 17, wherein the Housdorff dimension corresponds to the traffic in the network, wherein the traffic is obtained from a plurality of individual traffic streams.

19. A method comprising:
   receiving chunks of data from a network in a series of chunks of data;
   generating transmission time differences between the received chunks of data;
   estimating a Housdorff dimension for the series of the received chunks of data based on the generated transmission time differences; and
   analyzing traffic flow in the network based on the estimated Housdorff dimension.

20. The method of claim 19, wherein analyzing traffic flow includes: tracking the flow of chunks of data through the network.

21. The method of claim 19, wherein analyzing traffic flow includes: classifying network traffic based on predefined characteristic patterns of the Housdorff dimension.

22. The method of claim 19, wherein the series of chunks of data corresponds to chunks of data received from the network in a predetermined time interval.

23. The method of claim 19, wherein the chunks of data correspond to packet information.

24. The method of claim 19, wherein estimating the Housdorff dimension includes:
   estimating the Housdorff dimension using a maximum likelihood estimator.

25. The method of claim 24, wherein analyzing traffic flow includes:

comparing Housdorff dimensions estimated for multiple nodes in the network; and determining traffic flow start/stop between the multiple nodes based on the comparison.

26. The method of claim 19, wherein the network is a wireless network.

27. The method of claim 19, wherein the network is a wired network.

28. A computer-readable medium that stores instructions executable by one or more processors to perform a method, comprising:

obtaining time of transmission information for chunks of data passing through a network;

calculating differences in times of transmission between successive chunks of data based on the time of transmission information;

analyzing traffic flow in the network based on the calculated differences in times of transmission; and generating a Housdorff dimension from the differences in times of transmission, the Housdorff dimension characterizing traffic flow corresponding to the chunks of data.

29. The computer-readable medium of claim 28, wherein the obtained time of transmission information is obtained over a predetermined time interval.

30. A device in a network, comprising:

means for obtaining time of transmission information for chunks of data in the network;

means for calculating differences in times of transmission in successive chunks of data based on the time of transmission information;

means for generating a Housdorff dimension from the differences in times of transmission, the Housdorff dimension characterizing traffic flow corresponding to the chunks of data; and means for analyzing traffic flow in the network based on the Housdorff dimensions.

31. The communication tap of claim 30, further comprising:

means for classifying a communication associated with the chunks of data based on the Housdorff dimensions.

* * * * *